(12) United States Patent
Bauer et al.

(10) Patent No.: US 11,054,970 B2
(45) Date of Patent: Jul. 6, 2021

(54) SYSTEM AND METHOD FOR MULTI-LANGUAGE COMMUNICATION SEQUENCING

(71) Applicant: INTERACTIVE INTELLIGENCE GROUP, INC., Indianapolis, IN (US)

(72) Inventors: Scott P. Bauer, Indianapolis, IN (US); James R. Ullyot, Indianapolis, IN (US)

(*) Notice: Subject to any disclaimer, the term of this patent is extended or adjusted under 35 U.S.C. 154(b) by 0 days.

(21) Appl. No.: 14/883,962

(22) Filed: Oct. 15, 2015

(65) Prior Publication Data

US 2017/0109345 A1    Apr. 20, 2017

(51) Int. Cl.
| | |
|---|---|
| G06F 3/0484 | (2013.01) |
| G10L 15/22 | (2006.01) |
| H04M 3/493 | (2006.01) |

(52) U.S. Cl.
CPC ...... G06F 3/04842 (2013.01); G06F 3/04847 (2013.01); G10L 15/22 (2013.01); H04M 3/493 (2013.01); *H04M 2201/39* (2013.01); *H04M 2203/2061* (2013.01); *H04M 2203/355* (2013.01)

(58) Field of Classification Search
CPC . G10L 13/00; H04M 3/4938; H04M 2250/74; H04M 2207/40; H04M 2203/355; H04M 1/271; G06F 9/4443; G06F 3/16; G06F 3/167; G06F 8/38
See application file for complete search history.

(56) References Cited

U.S. PATENT DOCUMENTS

| | | | | |
|---|---|---|---|---|
| 6,631,186 B1 * | 10/2003 | Adams | ................. | H04M 1/247 |
| | | | | 379/201.12 |
| 6,904,401 B1 | 6/2005 | Hauduc et al. | | |
| 6,950,792 B1 * | 9/2005 | Nussbaum | ............. | G06F 9/454 |
| | | | | 704/8 |
| 7,698,642 B1 * | 4/2010 | Sarin | ....................... | H04L 51/24 |
| | | | | 379/67.1 |
| 8,644,803 B1 * | 2/2014 | Fox | ................... | H04M 1/72583 |
| | | | | 379/88.01 |
| 9,672,211 B1 * | 6/2017 | Olson | ................... | G06F 17/289 |
| 2002/0077819 A1 * | 6/2002 | Girardo | ................... | G10L 25/69 |
| | | | | 704/260 |
| 2002/0184002 A1 | 12/2002 | Galli | | |

(Continued)

FOREIGN PATENT DOCUMENTS

EP       1679867 A1    7/2006

OTHER PUBLICATIONS

International Search Report and Written Opinion dated Jan. 8, 2016 in related PCT application PCT/US15/55686 with International Filing date Oct. 15, 2015.

(Continued)

*Primary Examiner* — Mark Villena

(57) ABSTRACT

A system and method are presented for multi-language communication sequencing. Communication flows may support one or more languages, which may need to be created, removed, or edited. During sequence editing, prompts, data, expressions, pauses, and text-to-speech may be added. This may be done through the use of inline-selectors, which comprise a prompt or TTS, or through the use of dialogs, which may also provide error feedback. A main sequence may be capable of handling multiple languages which are supported and managed independent of each other.

11 Claims, 12 Drawing Sheets

(56) References Cited

U.S. PATENT DOCUMENTS

| | | | |
|---|---|---|---|
| 2003/0204404 A1* | 10/2003 | Weldon | H04M 3/493 704/270.1 |
| 2004/0044517 A1 | 3/2004 | Palmquist | |
| 2004/0267813 A1* | 12/2004 | Rivers-Moore | G06F 17/2247 |
| 2005/0135338 A1* | 6/2005 | Chiu | G10L 15/22 370/352 |
| 2005/0152516 A1 | 7/2005 | Wang et al. | |
| 2006/0093101 A1* | 5/2006 | Patel | H04Q 3/0029 379/88.16 |
| 2007/0036293 A1* | 2/2007 | Erhart | H04M 3/42323 379/88.16 |
| 2007/0073544 A1* | 3/2007 | Millett | G06F 9/454 704/277 |
| 2007/0133759 A1* | 6/2007 | Malik | H04M 3/493 379/80 |
| 2007/0140466 A1* | 6/2007 | Sharma | H04M 3/24 379/235 |
| 2008/0262848 A1* | 10/2008 | Shienbrood | H04M 3/4936 704/275 |
| 2009/0202049 A1 | 8/2009 | Ulug et al. | |
| 2010/0312565 A1* | 12/2010 | Wang | G10L 13/00 704/260 |
| 2013/0151231 A1* | 6/2013 | Giraudy | G06F 17/289 704/2 |
| 2015/0030140 A1* | 1/2015 | Abel | H04M 3/493 379/88.01 |
| 2015/0134322 A1* | 5/2015 | Cuthbert | G06F 17/289 704/3 |
| 2016/0080567 A1* | 3/2016 | Hooshiari | H04M 3/42229 379/88.01 |

OTHER PUBLICATIONS

Australian Government Examination Report No. for Application No. 2015411582, dated May 3, 2019, 3 pages.
Canadian Office Action for Application No. 3,004,700, dated Mar. 1, 2019, 4 pages.
Extended European Search Report for Application No. 15906376.7, dated Apr. 15, 2019, 7 pages.
Australian Government Examination Report No. 2 for Application No. 2015411582, dated Oct. 17, 2019, 3 pages.
Korean Intellectual Property Office Notice of Allowance with English Translation for corresponding Application No. 10-2018-7013755, dated May 25, 2020, 7 pages.
Examination Report regarding co-pending EP application No. 15 906 376.7 dated Nov. 20, 2020.

* cited by examiner

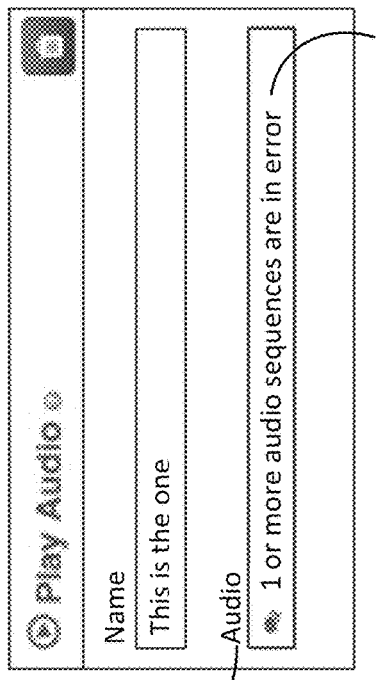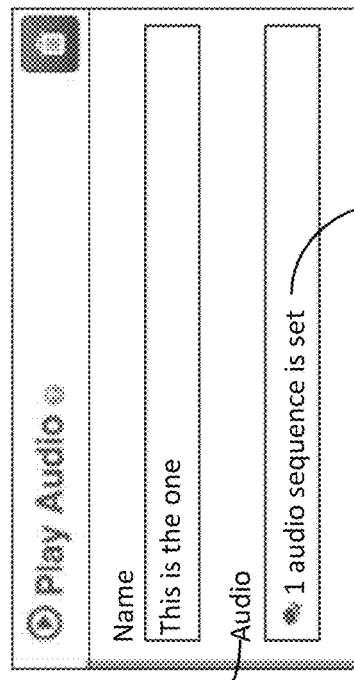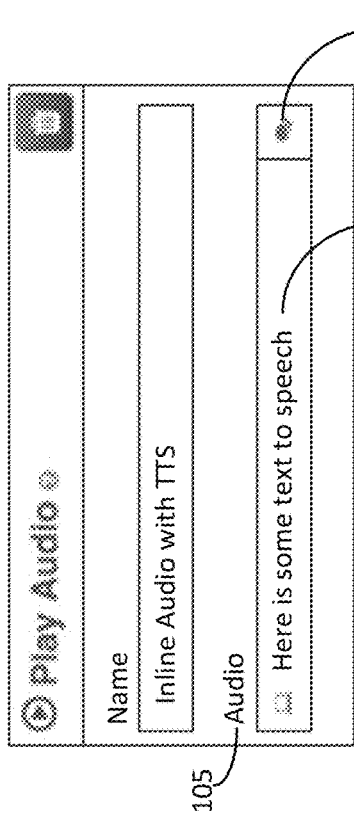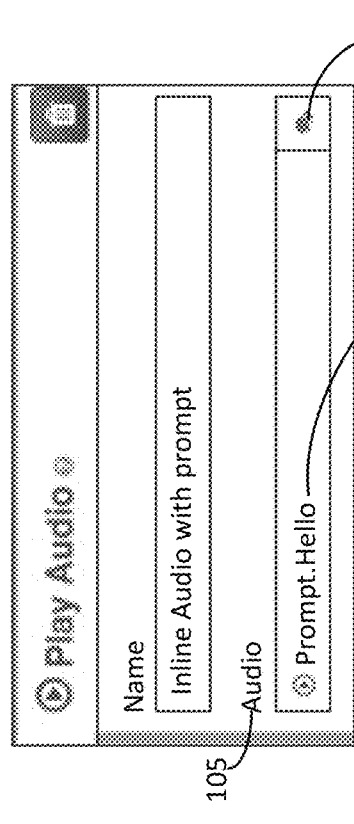
Fig 1a
Fig 1b
Fig 1c
Fig 1d

Fig 5b

SYSTEM AND METHOD FOR MULTI-LANGUAGE COMMUNICATION SEQUENCING

BACKGROUND

The present invention generally relates to telecommunications systems and methods, as well as business environments. More particularly, the present invention pertains to audio playback in interactions within the business environments.

SUMMARY

A system and method are presented for multi-language communication sequencing. Communication flows may support one or more languages, which may need to be created, removed, or edited. During sequence editing, prompts, data, expressions, pauses, and text-to-speech may be added. This may be done through the use of inline-selectors, which comprise a prompt or TTS, or through the use of dialogs, which may also provide error feedback. A main sequence may be capable of handling multiple languages which are supported and managed independent of each other.

In one embodiment, a method is presented for sequencing communication to a party utilizing a plurality of languages in an interactive voice response system, the method comprising the steps of: creating, by a user of the system, a prompt, wherein the prompt has a plurality of resources of attached; enabling, by the interactive voice response system, at least one supported language for the communication, wherein the communication is in the at least one supported language; enabling, for editing to the sequence, one or more of: prompts, data, expressions, pauses, and text-to-speech; enabling an alternate language for the communication, wherein the alternate language comprises an alternate sequence.

In another embodiment, a method is presented for sequencing communication to a party utilizing a plurality of languages in an interactive voice response system, the method comprising the steps of: selecting, through a graphical user interface, by a user, a prompt; and creating, by a computer processor, at run-time, a communication sequence using the prompt.

In another embodiment, a method is presented for sequencing communication to a party utilizing a plurality of languages in an interactive voice response system, the method comprising the steps of: entering, by a user, text into a graphical user interface, wherein the text is transformed into text-to-speech by a computer processor; and creating, by the computer processor, a communication sequence using the text-to-speech.

BRIEF DESCRIPTION OF THE DRAWINGS

FIGS. 1a-1d are diagrams illustrating embodiments of inline selectors.

FIGS. 5a-5b are diagrams illustrating embodiments of audio sequence editing.

DETAILED DESCRIPTION

Figure 2A:
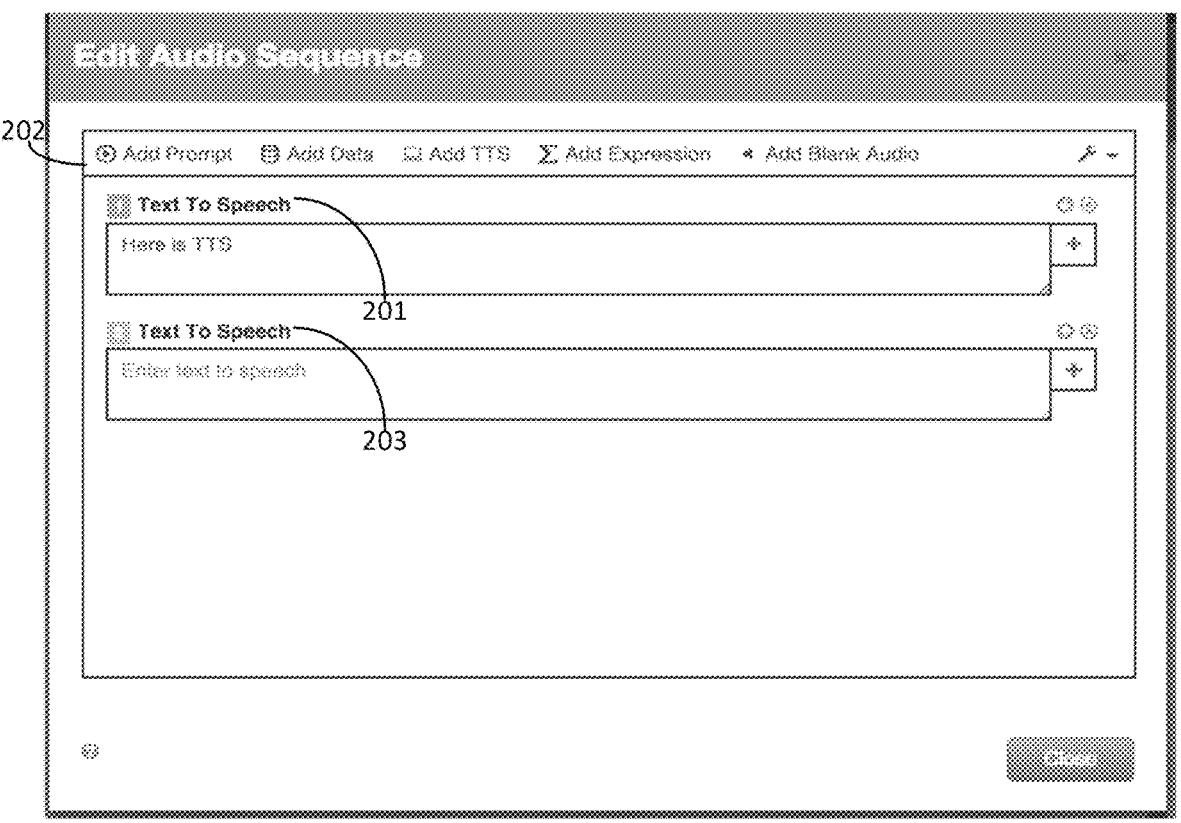
FIGS. 2a-2e are diagrams illustrating embodiments of sequence selectors.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a business environment, such as a contact center or enterprise environment, interactive voice response systems are often utilized, particularly for inbound and outbound interactions (e.g., calls, web interactions, video chat, etc.). The communication flows for different media types may be designed to automatically answer communications, present parties to interactions with menu choices, and provide routing of the interaction according to a party's choice. Options present may be based on the industry or business in which the flow is used. For example, a bank may offer a customer the option to enter an account number, while another business may ask the communicant their name. Another company may simply have the customer select a number correlated to an option. Systems may also be required to support many languages. In an embodiment, consolidated multi-language support for automatic runtime data playback, speech recognition, and text-to-speech (TTS), may be used.

In an embodiment, the call flows, or logic for the handling of a communication, that an IVR uses to accomplish interactions may comprise several different languages. In the management of these flows, a main sequence provides an audio sequence for all supported languages in a flow with the ability for a system user (e.g., flow author) to specify alternate sequences on a per language basis. The main sequence may also be comprised of one or more items. The main sequence may be capable of handling multiple languages which are supported in the IVR flow. The languages may be managed independently of each other in the event an alternate sequence is triggered. During editing of the sequences, error feedback may be triggered by the system and provided to a user for the correction of issues that arise.

In an embodiment, flows may comprise multiple sequences. For example, the initial greeting in a flow comprises a sequence, a communicant may be presented with a menu at which point they may be provided with another sequence, such as 'press 1 for sales', 'press 2 for Jim', etc. The selection of an option, in this example, triggers another sequence for presentation to the communicant.

Because business environments are not always consistent, changes may be needed to the audio without having to deconstruct the IVR. The TTS of a new prompt on the related prompt resources will remain the same TTS set by the author in the flow, which can be modified as appropriate.

Prompts such as "hello" may be created for greeting, for example, and stored within a database which is accessed by a run-time engine, such as a media server like Interactive Intelligence Group, Inc.'s Interaction Edge® product, that executes the IVR logic. A prompt may have one or more resources attached to it. Resources may comprise audio (e.g., a spoken "hello"), TTS (e.g., a synthesized "hello"), or a language (e.g., en-US). In an embodiment, the resource may comprise TTS and Audio and a language tag. In another example, the resource may comprise TTS or Audio, and a language tag. The language tag may comprise an IETF language tag (or other means for tagging a language) and may be used to identify a resource within a prompt. The language tag may also provide the grouping that is used for audio and TTS. In an embodiment, a prompt may only have one prompt resource per language. For example, two resources may not be associated with the German language.

In an embodiment, audio sequences may be edited where a prompt is followed by TTS or vice versa. A user may decide to specify a prompt or to specify TTS. The prompt or TTS may be turned into a sequence later as business needs dictate. For example, during the development of a flow, TTS may be initially used and at some later time converted to a sequence.

Audio sequences comprise an ordered list of indexed items to play back to a communicant interacting with the IVR. The items may include, in no particular order, TTS, data playback, prompts, pauses or breaks, and embedded audio expressions. A main sequence may be designated, with that designated sequence applying to all supported languages set on a flow. Alternate sequences may also be present in the flow. These alternate sequences may be enabled for specific languages, such that when an interaction exits the main sequences, such as by the selection of a new language, the alternate sequence for that new language takes over. The alternate sequence may be duplicated from the main sequence initially and further edited by a flow author. The main sequence may then be used for all supported languages in the flow with the exception of the alternate sequence enabled by the flow author. If alternate sequences are enabled for each supported language in the flow, the main sequence no longer applies since each alternate language overrides the main sequence. Thus, the sequencing of wording in prompts can be language specific. In an embodiment, one prompt may be sufficient for all languages, such as a "thanks_for_calling" prompt. Within that prompt, each language has the appropriate audio for use in the prompt, which is utilized in the main sequence.

Audio sequences may be configured through a dialog (e.g., a modal dialog or a window) or an inline selector. In an embodiment, inline selectors comprise for an easy means of configuration for TTS or prompt. FIGS. 1a-1d are diagrams illustrating embodiments of inline selectors, indicated generally at 100. In an embodiment, an inline selector comprises a one-item sequence, such as a TTS or a prompt.

With regards to interactions, an author may detail languages for the flow to support. In an embodiment, an initial greeting may be made using TTS or a previously created prompt. For example, the author may enter TTS for the initial greeting or select a pre-existing prompt, without having to open the sequence editor for configuration. In an embodiment, the inline selectors comprise TTS that will be played as an initial greeting. In another embodiment, the inline selectors comprise a prompt selection that will be played as an initial greeting.

FIG. 1a is an example of a one-item sequence utilizing TTS which FIG. 1b is an example of a one-item sequence utilizing prompts. The inline selector, such as in FIG. 1a and FIG. 1b, comprises the "audio" 105. An audio expression may also be included 106. Along with the audio expression, an icon 107 may be present where upon selecting the icon, a window for editing the audio sequence opens. A window may also open for the addition of prompts. These editing windows are described in greater detail in FIGS. 2a-2e below.

In an embodiment, errors and their descriptions 108 may be displayed for items, such as in FIG. 1c, where the error indicates that there is a problem with an audio sequence ("1 or more audio sequences are in error", for example). Attention may be called to the error by highlighting or by a font color change to the error and/or error descriptions, for example.

FIG. 1d is an embodiment of an audio sequence without an error, indicating that '1 audio sequence is set' 109. An icon, such as the dialogue clouds 110 exemplified in FIG. 1d, may also be indicative that this entry is not an inline entry of TTS or a prompt. In an embodiment, the user may have manually entered the sequence through a dialog as opposed to selecting a TTS or a prompt.

FIGS. 2a-2d are diagrams generally illustrating embodiments of sequence selectors. Each of FIGS. 2a-2d illustrate a single supported language, for simplicity. These windows generally indicate examples for configuring the dialog and sequence editing of audio expressions. In FIG. 2a, the window illustrates the audio expression is a TTS 201. A user may decide to add additional dialog, such as "Add Prompt", "Add Data", "Add TTS", "Add Expression", and "Add Blank Audio", to name a few non-limiting examples. These options may be displayed in a task bar 202. In FIG. 2a, "Add TTS" has been selected. As a result, an additional item in the sequence may be created. In FIG. 2a, this is identified as second in the sequence and is "Text to Speech" 203. Any number of items may be added to the sequence with the order of items editable. In an embodiment, a TTS string may additionally be promoted to a prompt and audio added in one or more languages, as further described in FIG. 2c.

Figure 2B:
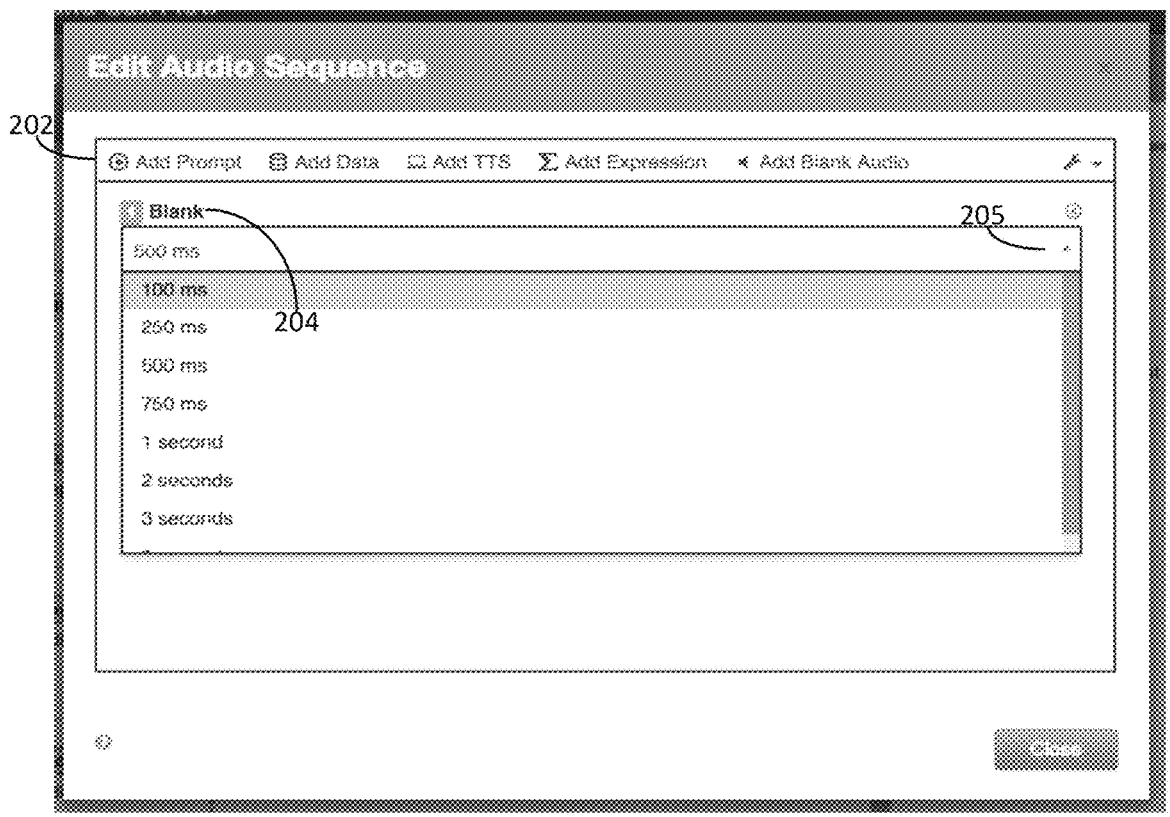

In FIG. 2b, "Add Blank Audio" has initially been selected 204. Blank audio may allow a user to configure the system to delay or pause in playback for a specified duration. In an embodiment, this may be performed from a drop-down menu 205, such as seen in FIG. 2b. Different durations may be presented for selection, such as 100 ms, 250 ms, 500 ms, etc.

Figure 2C:
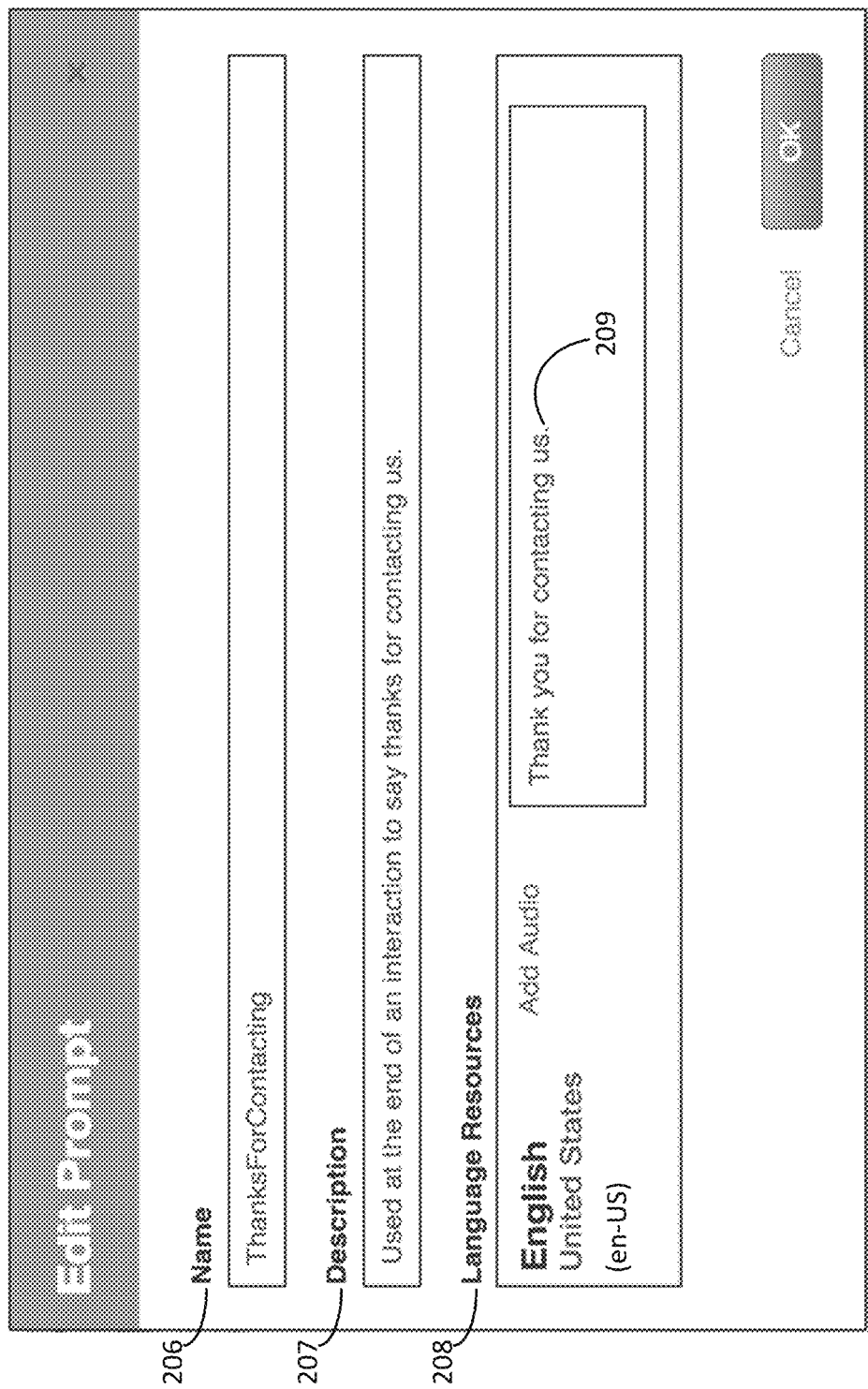

Further, simple TTS may be promoted to managed prompts that include audio and TTS for multiple languages, such illustrated in FIG. 2c. A flow author may specify the prompt name 206 and description 207 in order to create the prompt. Here, the name is "ThanksforContacting" and the description "Used at the end of an interaction to say thanks for contacting us". After the prompt has been created in the user interface, the TTS is set on each of the prompt resources, which are determined by the supported languages set on the flow 208. In FIG. 2c, English, United States, has been designated. A flow author may specify the audio to be included as "thank you for contacting us" 209. In an embodiment, two resources may be presented as prompt resources, if the supported languages are English and Spanish, for example.

Figure 2D:
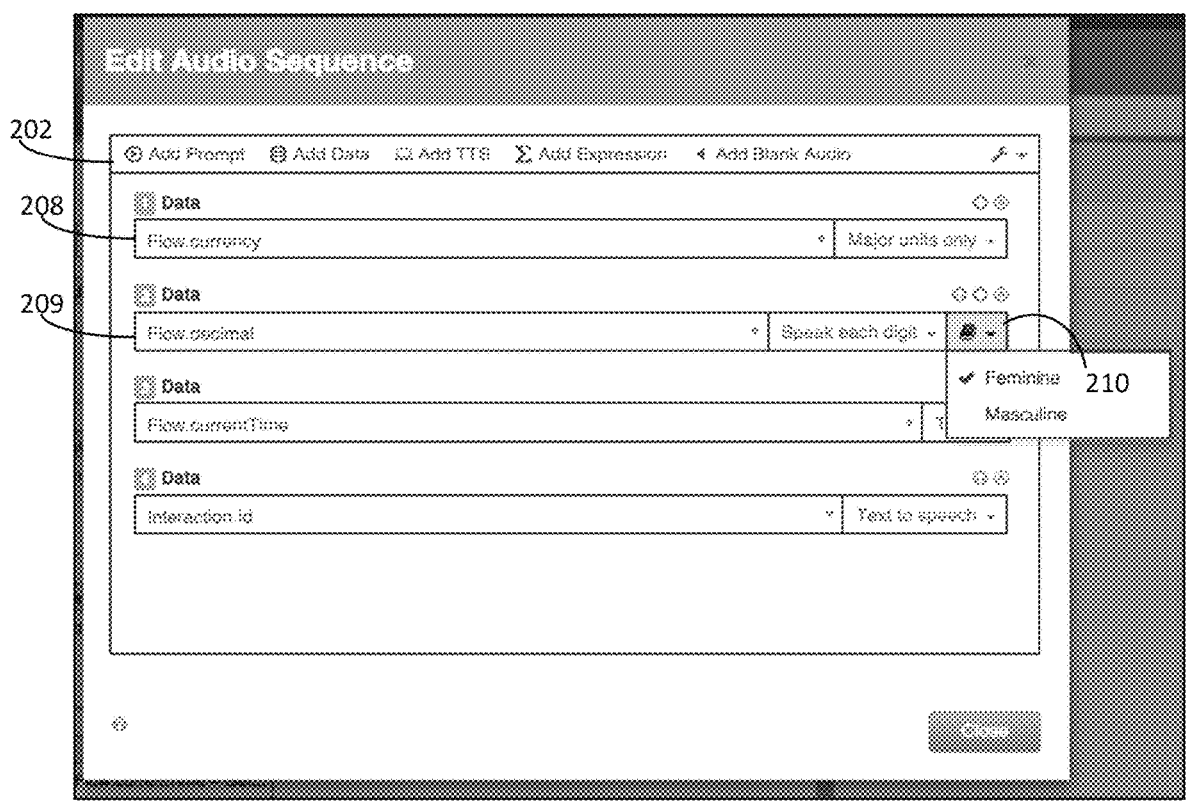

Additional data may also be included in the main sequence. In FIG. 2d, for example, four items have been included in the main sequence. Each item may be created by selecting the dialog "Add Data" from the task bar 202. Different types of data may be added, such as: dates and/or times, currencies, numbers that may represent customer information, etc. Depending on the type of data selected, different options may become available from the system for a user to choose. For example, data in item 1, 208, may comprise currency. A user may decide to accept major units only from the options available. For item 2, 209, a decimal has been selected. A user may decide that they want the system to speak each digit, speak the entire value, etc.

In certain languages that utilize gender and/or case, options may also include selecting between feminine, masculine, neuter, articles, etc., 210. A sequence may also be altered/reordered/removed dependent on the language.

In an example of gender utilization, a veterinary clinic has an IVR with a call flow running in Spanish-United States (es-US). Confirmation with a caller is being performed automatically as to what pets the caller has on file. For this particular customer they have one female cat on file, which needs confirmation. An example sequence follows, such that:

TTS: "Usted tiene" (you have)
Data: 1, Female
TTS: "gata"

At runtime the IVR would return: "Usted tiene una gata".

The generated expression comprises: Append(ToAudioTTS("Usted tiene"), ToAudioNumber(1, Language.Gender.Feminine), ToAudioTTS("gata")).

In an embodiment, where submitted numbers to 'ToAudioNumber' have gender specific representations, the runtime playback will play the correct prompt. For the example of the veterinary clinic above, "una" is used since the number '1' will need to agree with the gender of the noun (the female cat) that follows.

Articles may also be supported for languages. Meta-data may be retained about a language on whether or not it supports gender, what gender types are there (e.g., masculine, feminine, neuter), or case. If one of those options is specified by a flow author and the runtime has a special audio handler set up for that option, that handler will be played back to the communicant. In an embodiment, case and gender may also be combined together on playback and are not exclusive of each other. For example, using "ToAudioNumber(1, Language.Gender.masculine, Language.Case.article)", the gender options are grouped together and then the case options are grouped together. In an embodiment, the case and gender may be supported in the same dropdown menu of a user interface.

Figure 2E:
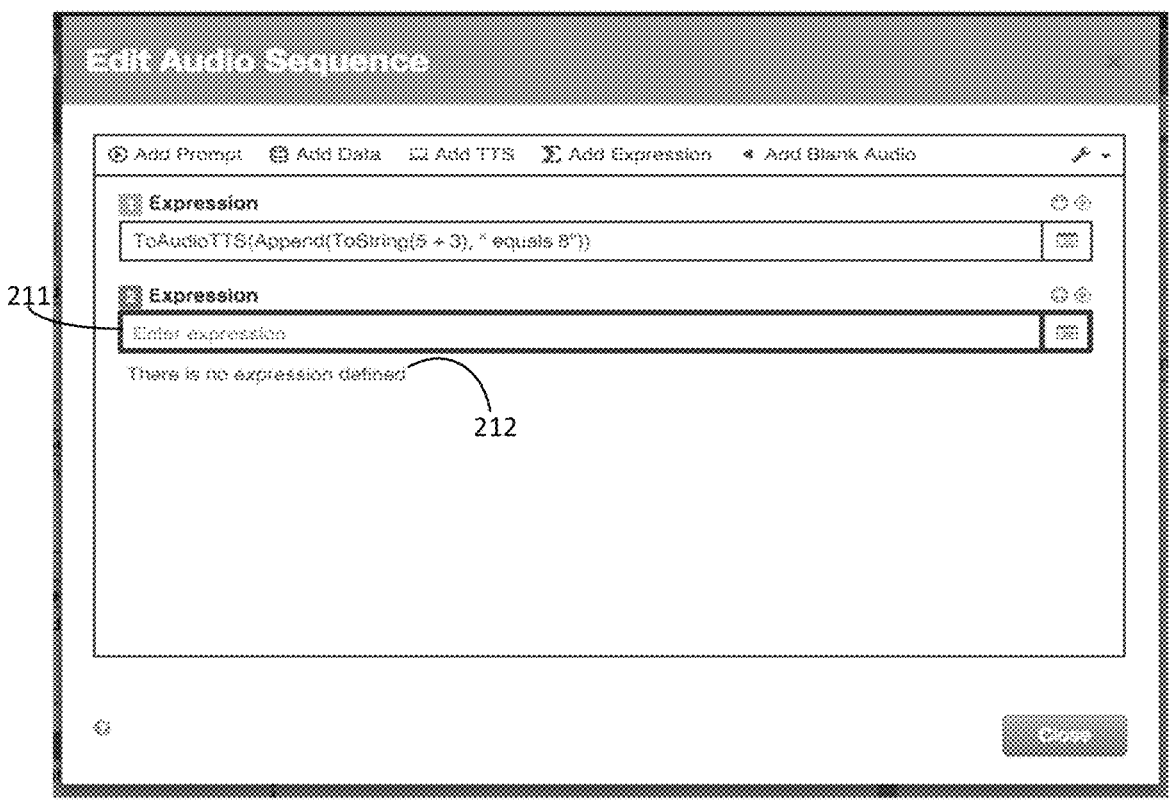

Errors may also be automatically indicated by the system during sequence editing. In FIG. 2e, an example is provided of an in-line error, 211. In-line errors may be indicated by means such as a color change, a warning, high-lighting, icons, etc. In FIG. 2e, the item entry field is highlighted. In this example, a user has added an item to the sequence, but did not specify expression text in the dialog. The system recognizes an error has occurred and provides an indication, such as feedback, to allow the user to correct the error in a quick edit form. In embodiments with longer expressions, an editor may be opened which provides more detailed feedback, such as converting audio to numbers, for example. In FIG. 2e, an indication is being made that "There is no expression defined" 212, allowing the user to quickly pinpoint the error and, in this example, define an expression.

Expressions may also be included in the sequence graphical user interface, which allow for greater flexibility such as, for example, 'ToAudioTTS(If(Hour(GetCurrentDateTimeUTC( ))>=12, "Good Afternoon", "Good Morning"))'. If a caller is in Greenwich, England, the expression would play TTS of "Good Morning" if running before 12:00 PM, otherwise, "Good Afternoon". Expressions may also allow for dynamic playback within a sequence, such as the TTS of "are the last four digits of your social security number". The expression may become: "ToAudioTTS(Substring(Flow.CustomerSSN, Length(Flow.CustomerSSC)-4,4), Format.String.PlayChars)". The expression in this example is being used to extract part of the data. The data comprises the social security number of the customer with the last four characters picked to be read back to the customer as spoken integers in the language in which the flow is running. Expressions may be used to also perform mathematical calculations and text manipulation, such as adding orders together or calculating a delivery date.

Expressions may also comprise grammars that return a type of audio to provide more control with the type of data played back. In an embodiment, this may also be applied to communications and/or to flows that run while a communicant (e.g., caller) is waiting on hold for an agent (e.g., In-Queue flows).

Figure 3A:
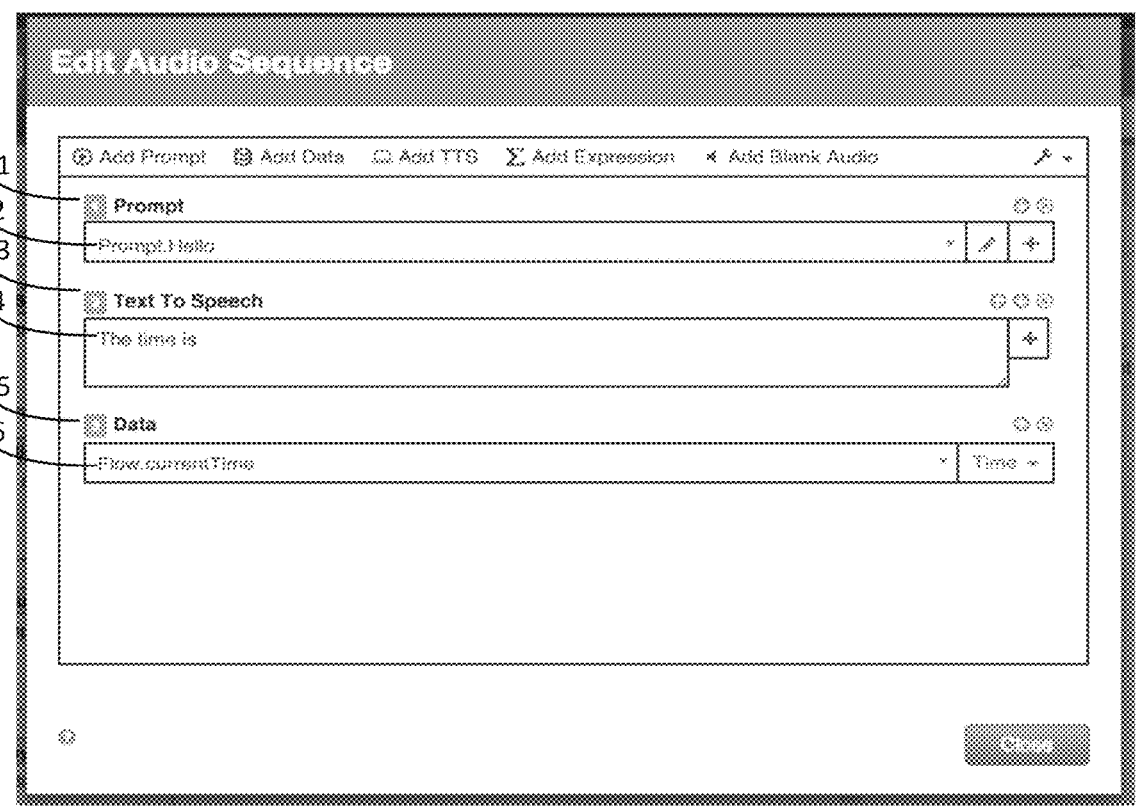
FIG. 3a-3b are diagrams illustrating embodiments of audio sequences.
Figure 3B:
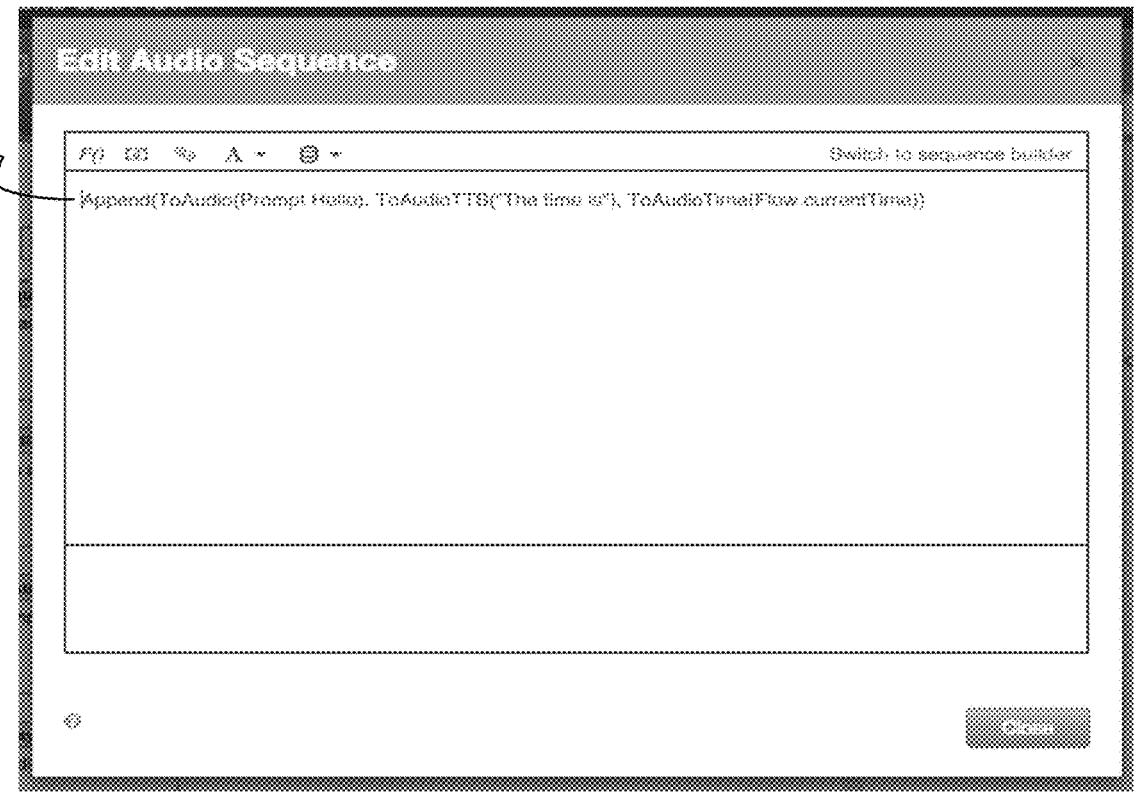

Audio sequences may be edited. In FIGS. 3a and 3b, examples of audio sequences are generally provided. An audio sequence may be presented and a user may decide to use the large/long expression editor. In FIG. 3a, for example, index 1, 301, describes a prompt, such as "Prompt.Hello" 302, followed by an item for TTS 303. A user may indicate that they want the time to be provided 304. Another data item 305 may be added to provide the current time 306. In FIG. 3b, integrated expression help may be provided such that a user may obtain more detailed error feedback, if available. The output of the audio sequencing editor comprises an expression. Here, the system may append to an audio prompt the custom audio "the time is" followed by an insert of the time, as exemplified with the expression "Append(ToAudio(Prompt.Hello), ToAudioTTS("The time is"), ToAudioTime(Flow.currentTime))" 307.

In embodiments where an alternate language is enabled, for example, an expression may be generated for that language in addition to an expression generated for the main sequence. Items within the audio sequence editor are validated for correctness individually in order to display appropriate errors for each sequence item. In an embodiment, if one or more sequence items are in error within a sequence, either the main sequence or language specific sequence tab near the dialog will reflect that it is in error as well.

Figure 4A:
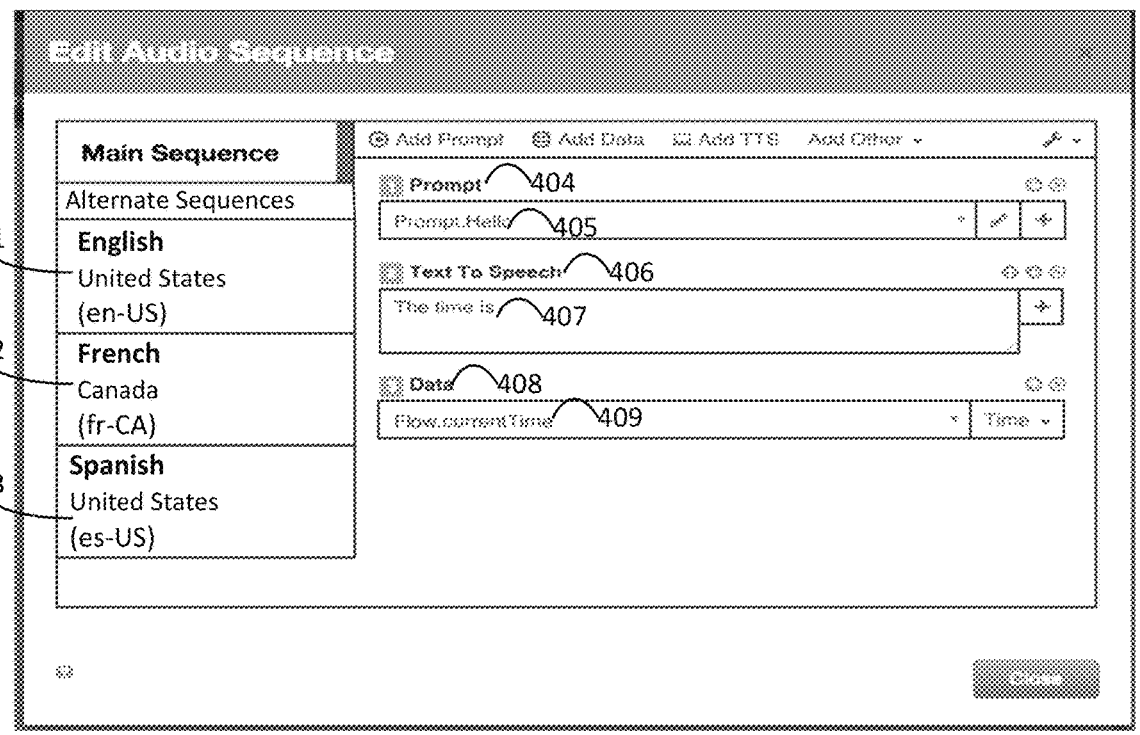
FIGS. 4a-4e are diagrams illustrating embodiments of multi-language sequences.

FIGS. 4a-4d are diagrams generally illustrating multi-language sequences. A plurality of language sequences may be defined such that there may be one or more main language sequences, or a main language with alternate language sequences, to name some non-limiting examples. Errors may automatically indicate if a main language sequence does not support an alternate language sequence. For example, TTS may be selected for a language in which the TTS engine may be unable to read the selected language's TTS back. A validation error may thus be generated reflecting that TTS cannot be used in that language. In FIG. 4a, an example of a multi-language sequence is provided. Languages which may be supported include US English (en-US) 401, Canadian French (fr-CA) 402, and US Spanish (es-US) 403, to name a few non-limiting examples. The audio sequence presented comprises a prompt 404, such as "Prompt.Hello" 405, followed by an item for TTS 406, such as "The time is" 407. A third item for data 408 is also presented to provide the current time, such as "Flow.currentTime" 409.

Figure 4B:
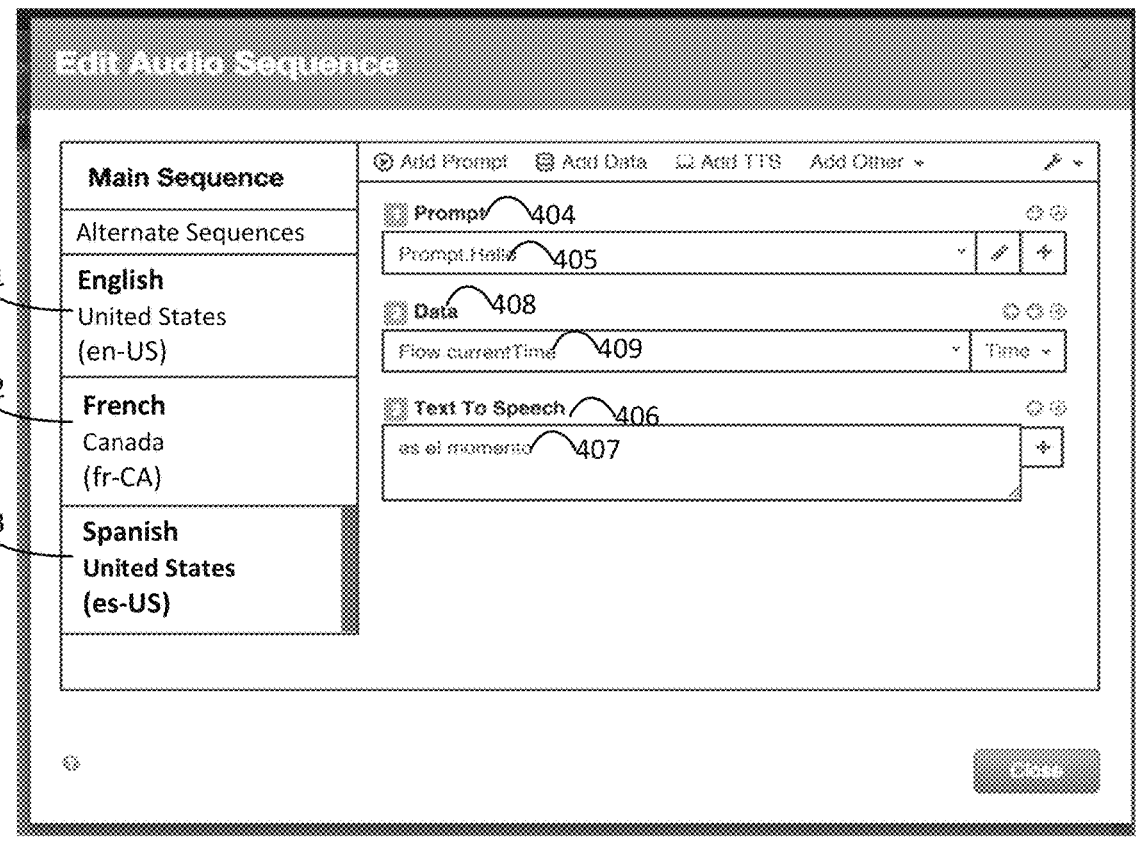
Figure 4C:
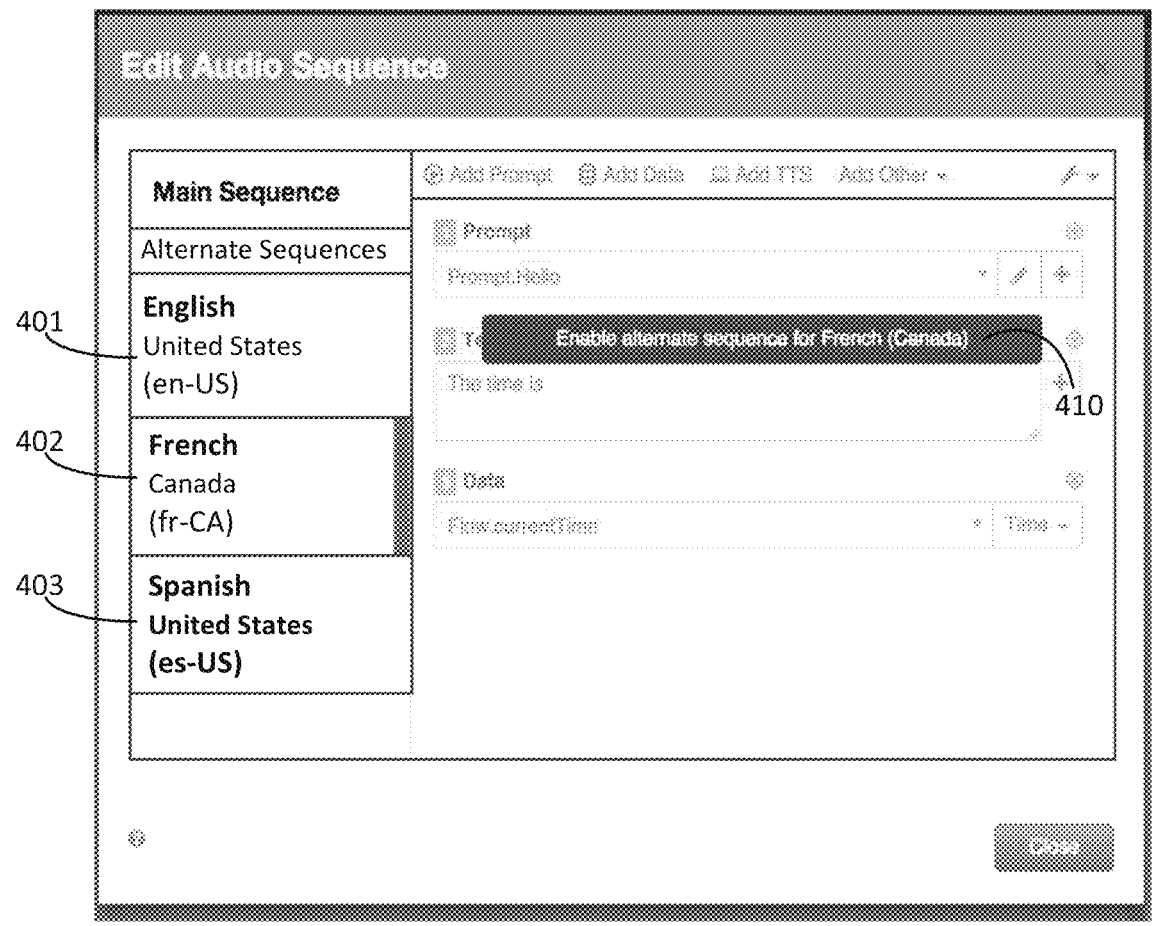

In FIG. 4b, a language, such as es-US 403 may be designated for the main sequence, with edits to items being made. In this example, the item for TTS 406 may be edited to "es el momento" 407 and the sequence reordered with the item for TTS moved into position 3 and the data item 408 moved into position 2. Alternate sequences may be enabled for the main language, such as fr-CA 402, as illustrated in FIG. 4c. In an embodiment, an indicator may confirm with the user that they want to enable alternate sequences for French (Canada) 410.

Figure 4D:
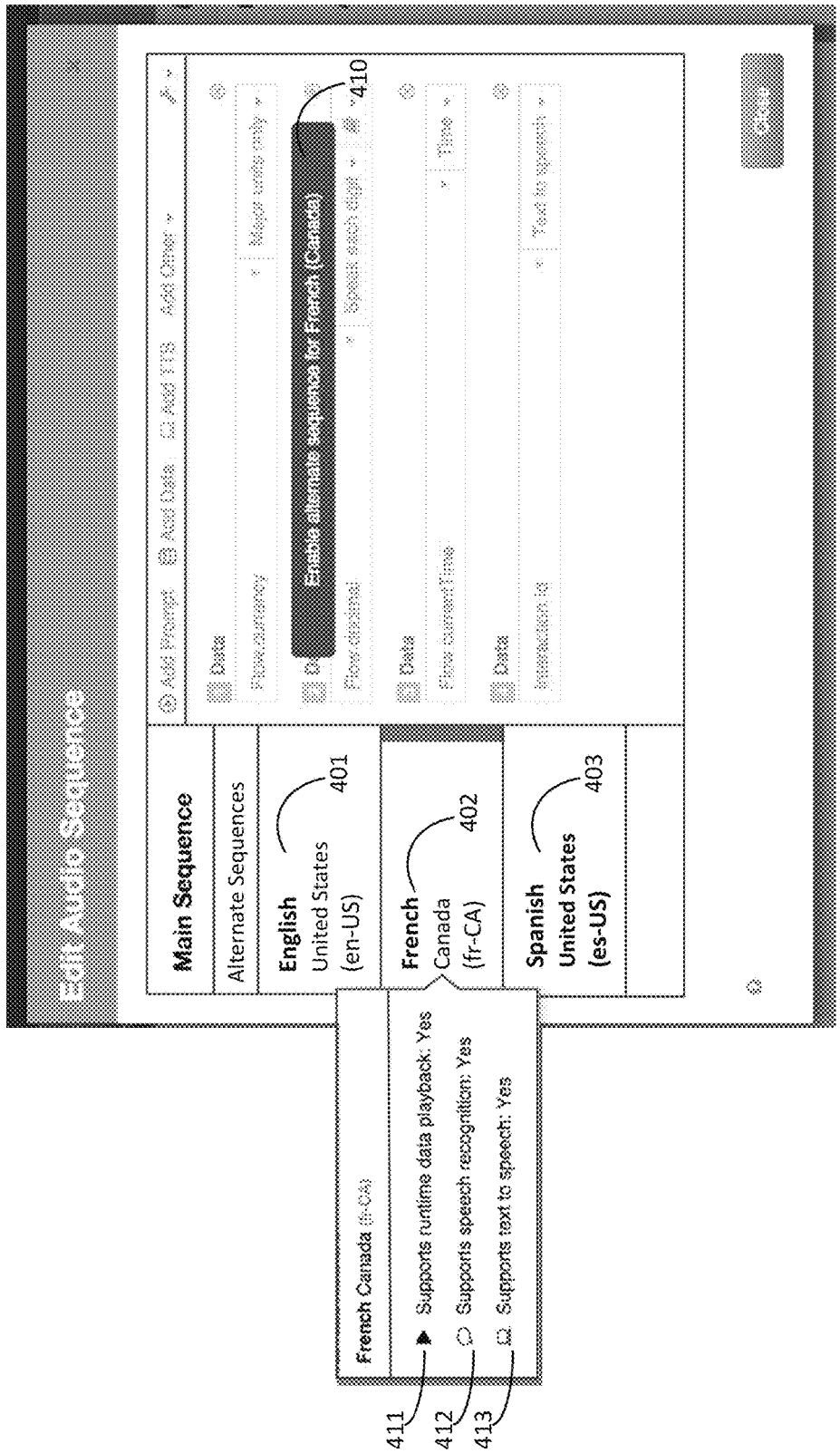

Each language may have different pieces of information associated with it, as generally exemplified in FIG. 4d. For example, information such as "Supports runtime data playback" 411, "Supports speech recognition" 412, and "Supports text to speech" 413, may be included to allow for more information about what the system supports. In this non-limiting example, a "yes" after each piece of information indicates that these are supported in the desired language. Thus, indications may be made as to whether that language sequence supports certain features or not.

Figure 4E:
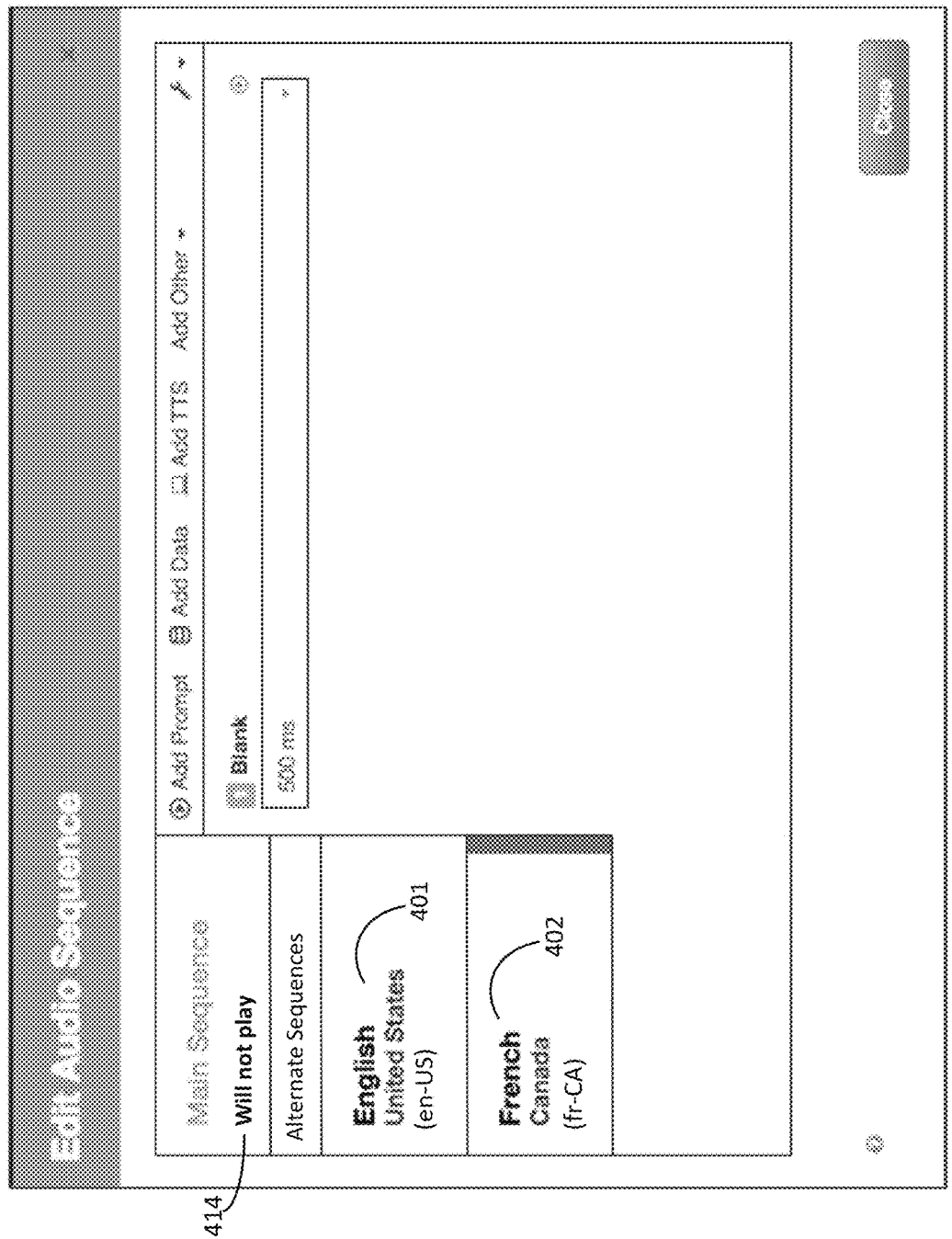

In another embodiment, the main audio sequence may not be designated to play at run time, whether by error or intentionally. In this scenario, as generally indicated in FIG. 4e, an indicator 414 may let the user know that this sequence will not play. As a result, the system may revert to one of the alternate sequences.

Figure 5A:
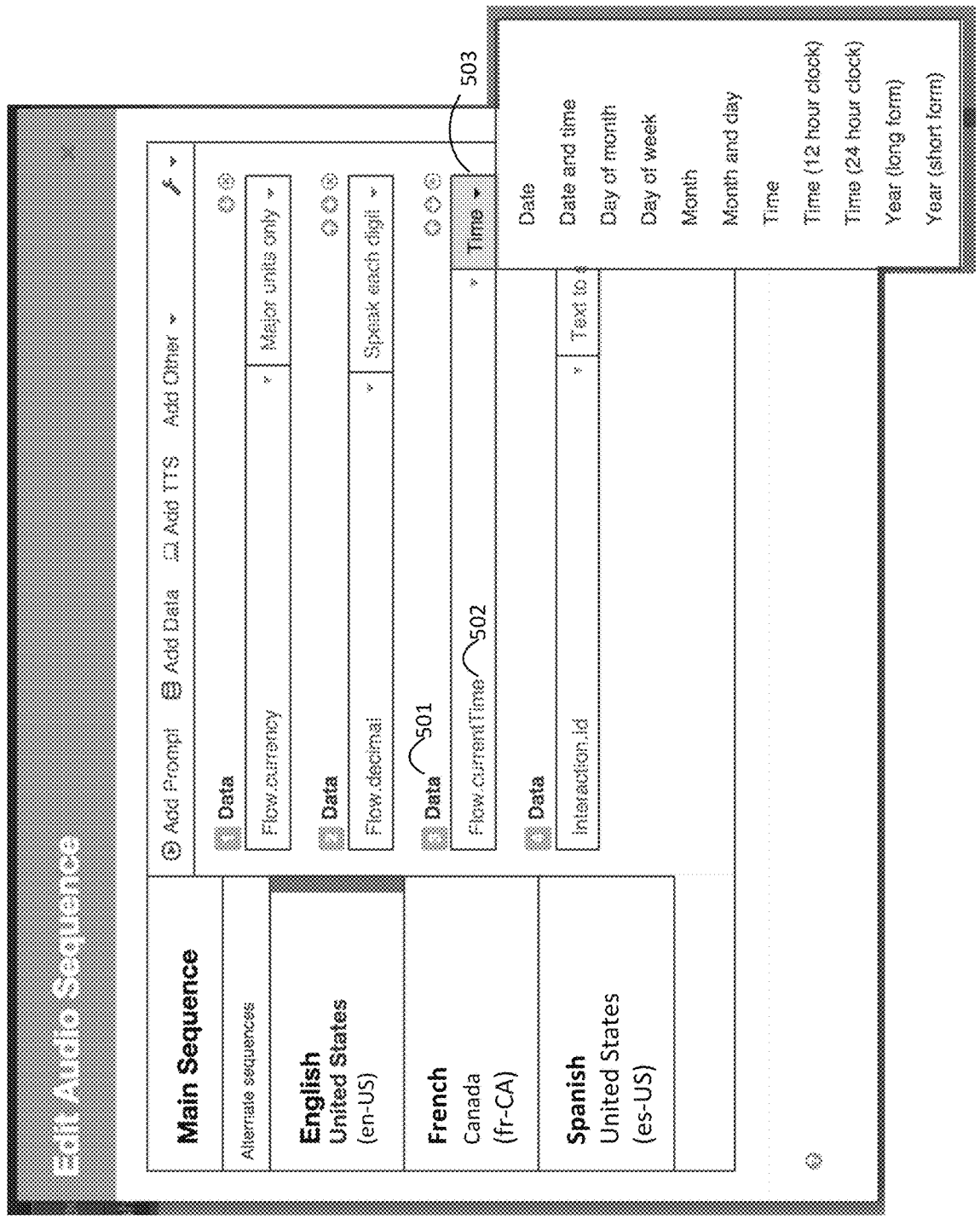
Figure 5B:
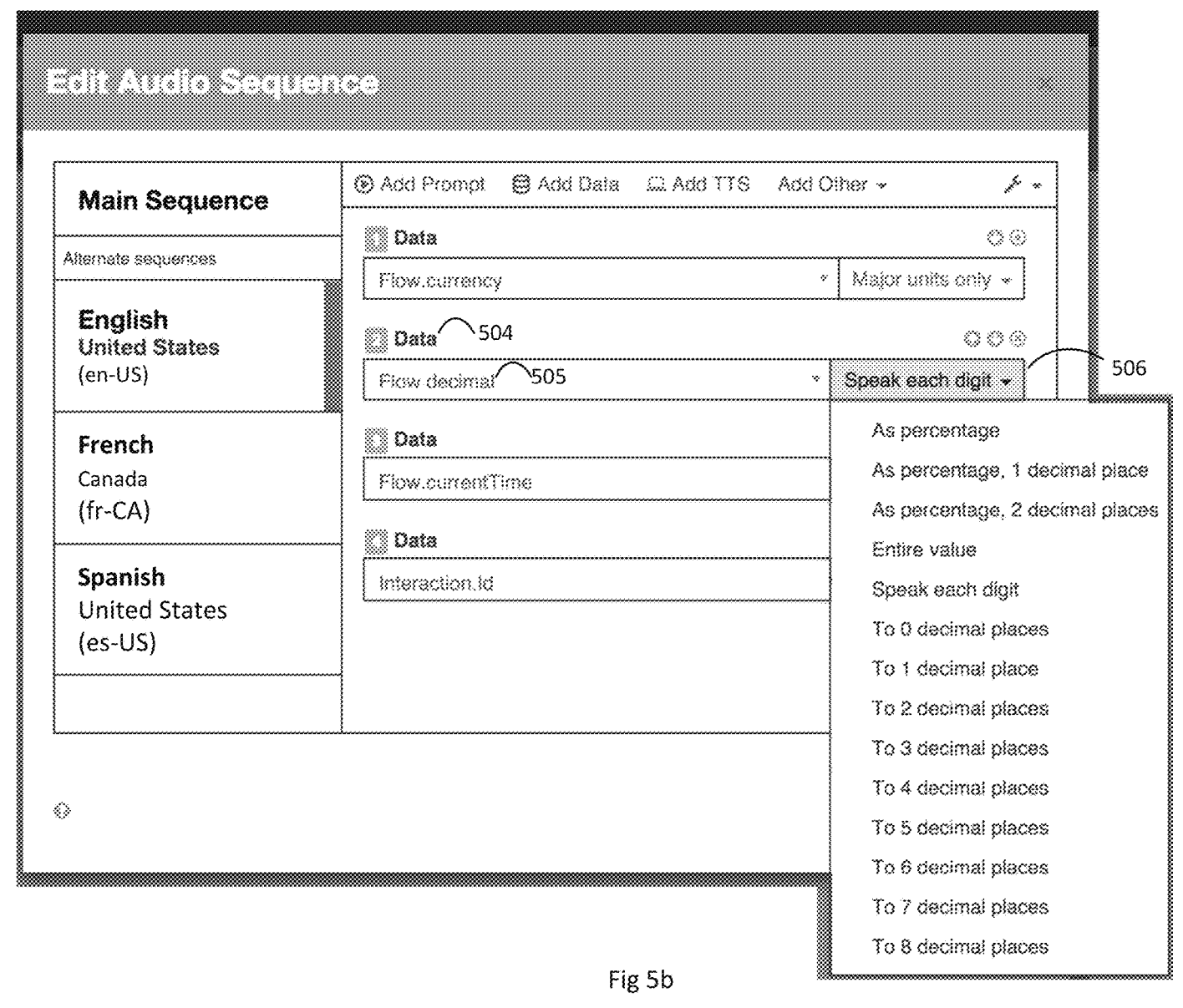

FIGS. 5a-5c are general diagrams of different options available for audio sequence editing. In item 3, 501, of the dialog exemplified in FIG. 5a, for example, data for playback may be chosen. In an embodiment, if the current time is indicated (e.g., "Flow.currentTime") in an item, options may include to present time as a "date", "date and time", "month", etc. The options may be presented in a drop down menu 503, for example, or by another means such as a separate window.

In an embodiment, such as illustrated generally in FIG. 5b, if an integer is indicated in the data item 504 (e.g., "Flow.decimal" 505), options may be presented 506 which include for the synthesized speech to "speak each digit", provide the "entire value", provide "as percentage", etc.

Figure 6:
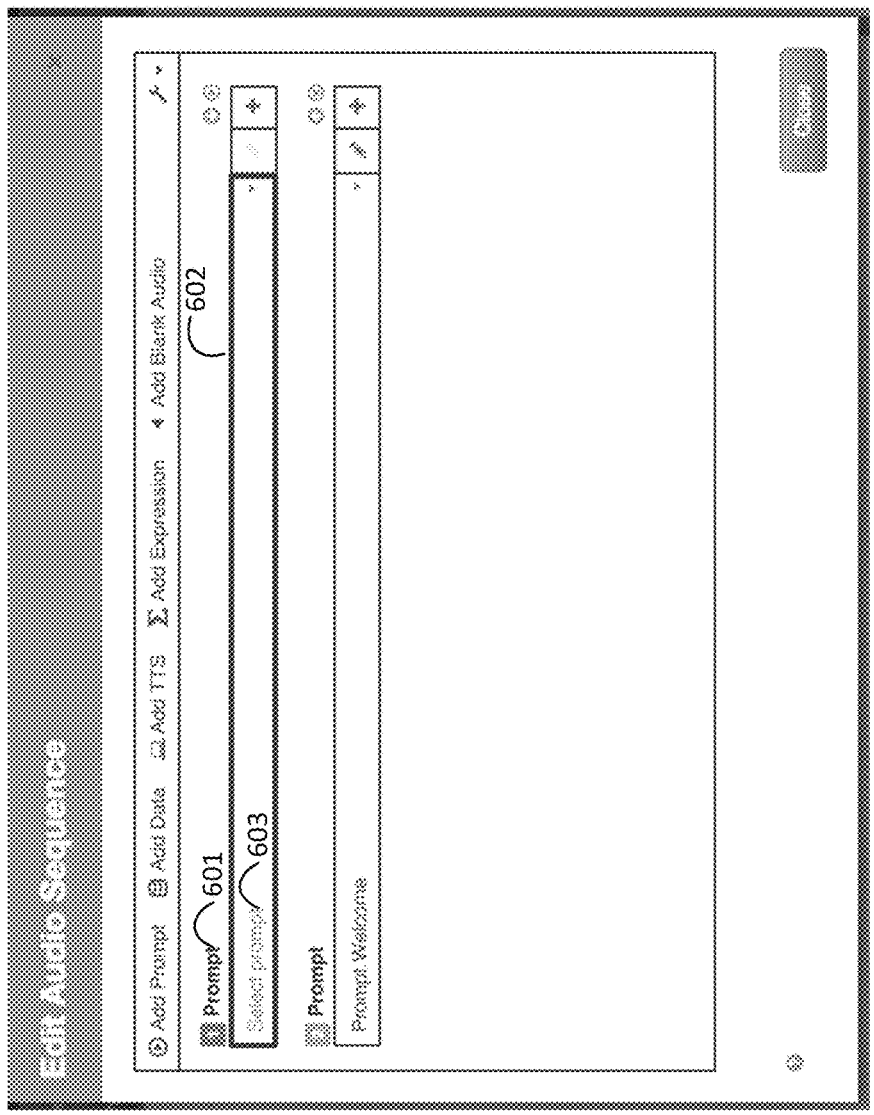
FIG. 6 is a diagram illustrating an embodiment of an error.

In embodiments where errors arise, these may be indicated to a user, such as generally presented in FIG. 6. In an embodiment, the indexed item may be highlighted and include a tool tip indicating that an error has occurred. In this example, item 1, 601, has been highlighted 602 to indicate an error. Within the item, the message "Select prompt" is provided 603 to the user.

Application of the embodiments described herein is not limited to calls. Communications in general may be applied, such as for text based interactions like web chat, to name a non-limiting example. In the case of a web chat, runtime might utilize the TTS component of a prompt resource instead of trying to pick up audio. As such, TTS of "Hello" on a web chat would be the text 'Hello'.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for sequencing communication to a party utilizing a plurality of languages in an interactive voice response system, the method comprising the steps of:
   creating, by a user of the system, a prompt, wherein a plurality of resources are attached to the prompt and wherein the prompt comprises a sequence handling a plurality of supported languages, the sequence comprising a first ordered list of one or more indexed items to play back;
   enabling, by the interactive voice response system, at least one supported language of the supported languages for the communication, wherein the communication is in the at least one supported language;
   enabling, for editing to the sequence, one or more of: prompts, data, expressions, pauses, and text-to-speech, wherein expressions are selected by the user for editing; and
   enabling an alternate language different from the supported languages for the communication, comprising:
      duplicating the sequence to generate an alternate sequence for the alternate language, the alternate sequence comprising a second ordered list of one or more indexed items to play back; and
      editing the second ordered list in accordance with input from the user of the system such that the second ordered list is different from the first ordered list; and
   altering, by the user of the system, the expression for dynamic playback within the sequence, wherein the expression is customized to extract time data from a caller to the interactive voice response system to play a greeting prompt based on local time of the caller.

2. The method of claim 1, wherein the plurality of resources comprise a language tag wherein the language tag comprises text-to-speech.

3. The method of claim 1, wherein the plurality of resources comprise a language tag, wherein the language tag comprises audio.

4. The method of claim 1, wherein the alternate sequence overrides the main sequence in the event the alternate language is selected.

5. The method of claim 1, wherein the data comprises: dates, times, currencies, numbers, and database lookups.

6. The method of claim 1, wherein the pause comprises a delay of audio playback.

7. The method of claim 1, wherein the editing comprises addition, deletion, or re-arranging.

8. The method of claim 7, wherein validation is provided in real-time for editing.

9. The method of claim 8, wherein the validation comprises errors placed adjacent to a sequence step in error.

10. The method of claim 1, wherein the enabling, for editing to the sequence, comprises enabling indexed items of a sequence for editing.

11. The method of claim 1, wherein the text-to-speech is capable of automatic conversion into a prompt for a supported language resource.

\* \* \* \* \*